United States Patent [19]

Saussier et al.

[11] Patent Number: 4,873,699
[45] Date of Patent: Oct. 10, 1989

[54] METHOD AND DEVICE FOR CODING AND DECODING A BROADBAND TRANSMISSION

[75] Inventors: Alain Saussier, Argenteuil; Bruno R. Sebilet, Rueil Malmaison, both of France

[73] Assignee: Societe Nationale D'Etude et de Construction de Moteurs D'Aviation, Paris, France

[21] Appl. No.: 170,232

[22] Filed: Mar. 18, 1988

[30] Foreign Application Priority Data

Mar. 19, 1987 [FR] France ................... 87 03778

[51] Int. Cl.⁴ ............................................. H04K 1/00
[52] U.S. Cl. ....................................................... 375/1
[58] Field of Search ........................ 375/1; 380/34, 49

[56] References Cited

U.S. PATENT DOCUMENTS

| | | | |
|---|---|---|---|
| 4,308,617 | 12/1981 | German, Jr. ............... | 375/1 |
| 4,447,907 | 5/1984 | Bjornholt et al. .......... | 375/1 |
| 4,475,215 | 10/1984 | Gutleber ..................... | 375/1 |
| 4,477,912 | 10/1984 | Russell ....................... | 375/1 |
| 4,510,579 | 11/1985 | Nossen ........................ | 375/1 |
| 4,730,340 | 3/1988 | Frazier, Jr. ................. | 375/1 |
| 4,776,012 | 10/1988 | Zscheile, Jr. et al. ...... | 375/1 |

FOREIGN PATENT DOCUMENTS 0133107 2/1985 European Pat. Off. .

OTHER PUBLICATIONS

1985 IEEE Military Communications Conference, Milcom '85, Boston, MA., 20-23, Oct. 1985, "The Electronic Battle: A New Era in Military Communications", Conference Record vol. 1 of 3, pp. 30-34, IEEE, New York, US; R. Ward et al.

1985 IEEE Military Communications Conference, Milcom '85, Boston, MA., 20-23, Oct. 1985, "The Electronic Battle: A New Era in Military Communications", Conference Record vol. 1 of 3, pp. 18-24, IEEE, New York, US; A. K. El-Hakem et al.

*Primary Examiner*—Salvatore Cangialosi
*Attorney, Agent, or Firm*—Oblon, Spivak, McClelland, Maier & Neustadt

[57] ABSTRACT

In a method of coding and decoding a broadband transmission of the spread spectrum type, the signal to be transmitted is encoded by modulation in accordance with a code consisting of a pseudo-random binary sequence of period T composed of two alternating half-sequences of period T/2 and having virtually nil cross-correlation. In the receiver a reception code is generated which is the same as the transmission code except that one of the half-sequences of the reception code is shifted in a circular rotational sense relative to the corresponding half-sequence of the transmission code. This reception code enables synchronization of the transmission and reception code generators by correlation of the reception code with the received coded signal using only one correlator, and is also used to control a demodulator for decoding the received signal.

5 Claims, 4 Drawing Sheets

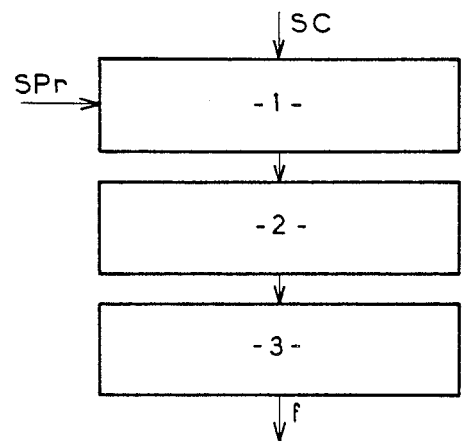
FIG:1
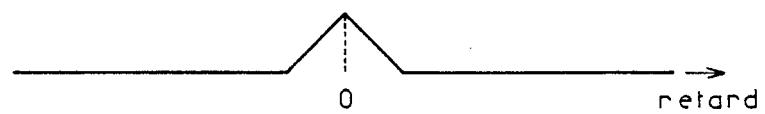
FIG:2
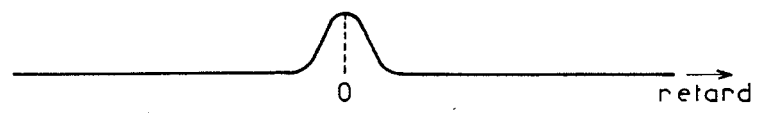
FIG:3

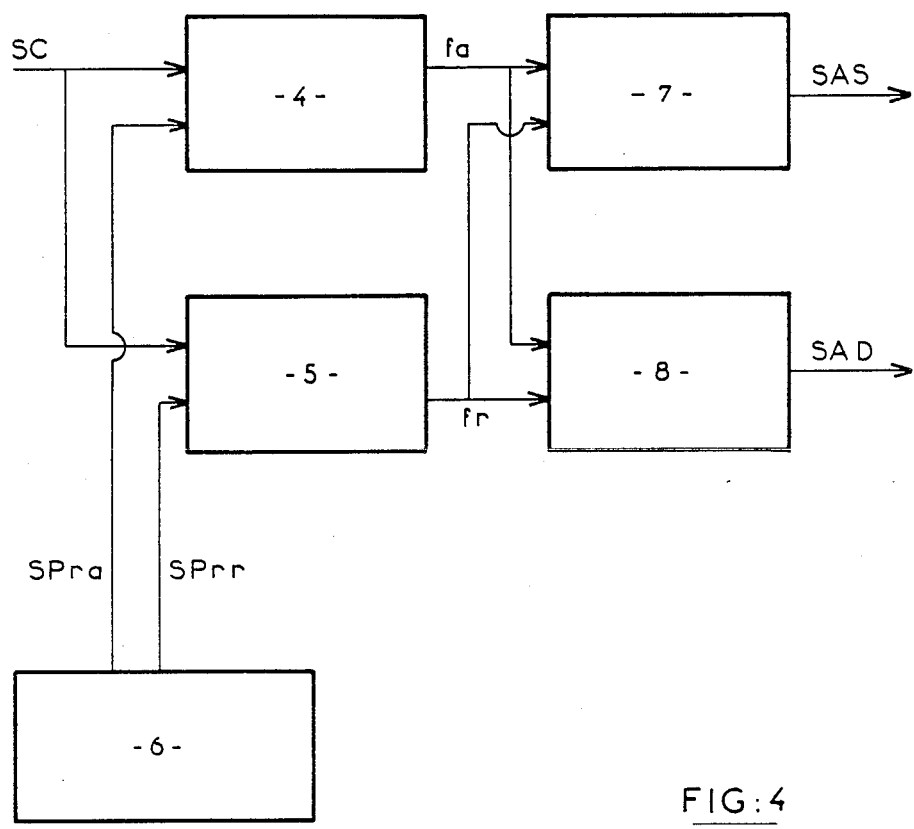
FIG:4

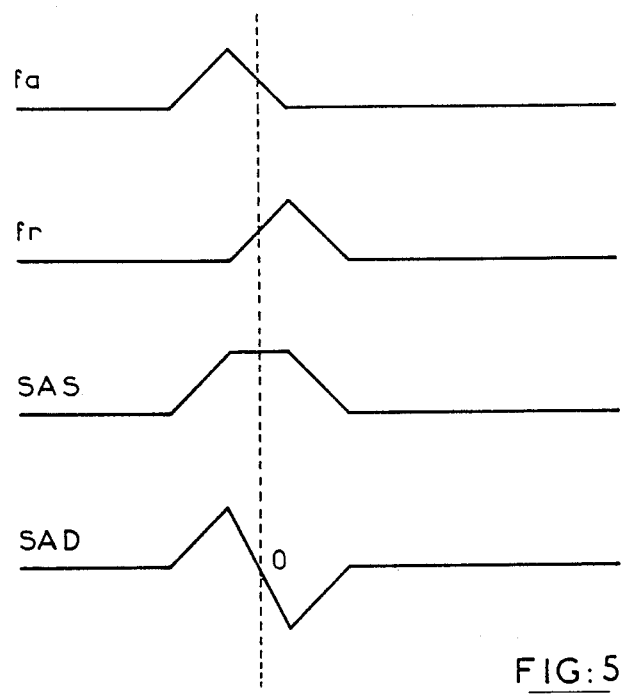
FIG:5
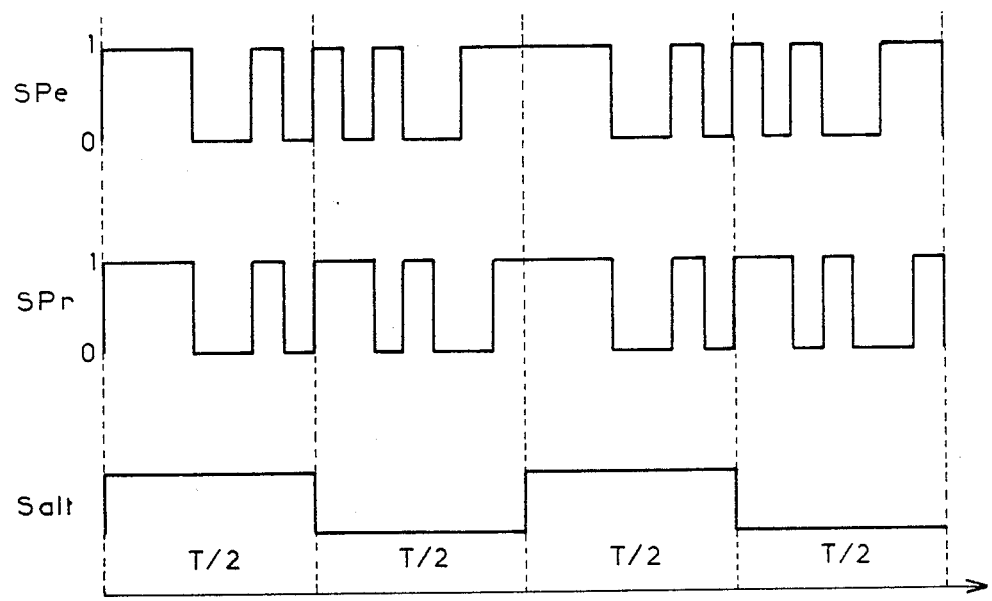
FIG:6

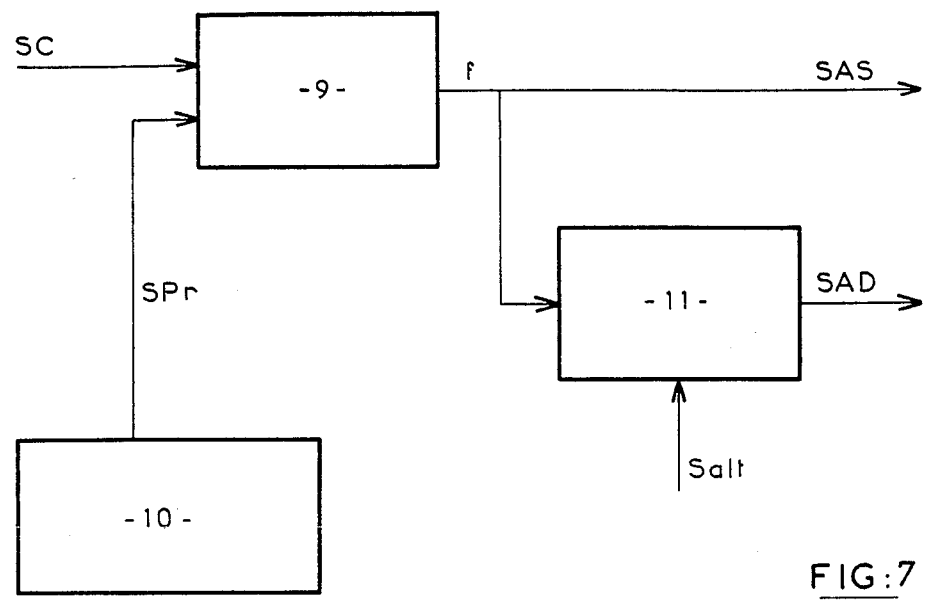
FIG:7
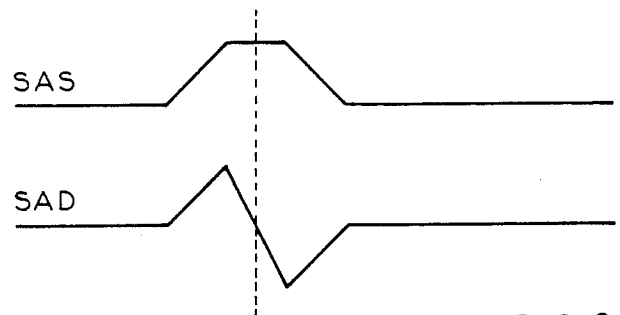
FIG:8

METHOD AND DEVICE FOR CODING AND DECODING A BROADBAND TRANSMISSION

BACKGROUND OF THE INVENTION

1. Field of the Invention

The present invention relates to a method of coding and decoding a broadband transmission, the method being of the type known as "spread spectrum" and in which the real signal to be transmitted is modulated by means of a modulator controlled by a code consisting of a pseudo-random sequence of binary values and the coded signal transmitted and received is demodulated by means of a demodulator controlled by the same code, the code used in reception being tuned relative to that used for transmission by correlation with the signal received. The invention also related to a device for carrying out the coding and decoding method.

2. Summary of the Prior Art

It is well known, with a view to preventing interference with and the deciphering of a transmission, to code the transmission by means of a broad spread of the spectrum. In the method referred to above, the spread of the spectrum is effected by modulating the real signal by a code whose spectrum is very much wider. In reception, the code is retuned by correlation with the signal received for this purpose, the control being achieved by means of a measurement of the synchronization error obtained by establishing the difference of advanced and retarded correlation measurements obtained by the correlation of the received signal with two shifted versions of the coded signal generated by the receiver.

Such a synchronization process has been described, in particular, by R.C. Dixon in "Spread Spectrum Techniques", at pages 210 ff under the heading "Delay-Lock Tracking Loop".

This known method thus requires, in order to carry it out, two correlators which effect the advanced and delayed measurements, as well as circuits which deliver sum and difference signals.

However, in numerous applications, constraints imposed by volume or cost of materials make it desirable to look for a simpler arrangement, such as one which requires only one correlator instead of two, and it is therefore one of the objects of the present invention to provide a method of the type described earlier which retains the advantages of the known method but which requires only one correlator, for its operation.

SUMMARY OF THE INVENTION

According to the invention, this object is achieved by a method of coding and decoding a broadband transmission comprising the steps of:

(a) generating a transmission code consisting of a pseudo-random sequence of binary values;
(b) controlling a modulator using said transmission code to modulate the real signal to be transmitted;
(c) transmitting and receiving said modulated signal;
(d) generating a reception code for use in demodulating the received signal;
(e) synchronizing said reception code wtih said transmission code by correlation of said reception code with the received signal; and
(f) controlling a demodulator by means of said synchronized recpetion code to demodulate said received signal to derive said real signal;

wherein said transmission code generated in step (a) comprises a pseudo-random seqaence of period T consisting of two alternating pseudo-random half-sequences of period T/2 and of nil or almost nil cross-correlation, and said reception code generated in step (d) is identical to said transmission code except that one of the half-sequences of said reception code is shifted in a circular rotational sense relative to the corresponding half sequence of said transmission code.

Preferably the shift between the relatively shifted half-sequences of the transmission and reception codes is equal to one bit.

The present invention also provides means for carrying out the coding and decoding method in a communications system comprising a transmitter and at least one receiver, the means comprising: in the transmitter, a first code generator for generating a transmission code consisting of a pseudo-random binary sequence of period T and composed of two alternating pseudo-random half-sequences of period T/2 and with nil or almost nil cross-correlation, and a modulator controlled by said transmission code to modulate the real signal to be transmitted and thereby generate a coded signa; and in said at least one receiver, a second code generator for generating a reception code which is identical to said transmission code except that one of the half-sequences of said reception code is shifted in a circular rotational sense relative to the corresponding half-sequence of the transmission code, a demodulator controlled by said reception code to demodulate said coded signal received from said transmitter and to derive said real signal, and a synchronization device for synchronizing said second code generator with said first code generator by correlation of said reception code with said received coded signal to derive sum and difference synchronization control signals, said device comprising a single correlator which receives said received coded signal and said reception code generated by the second code generator and is operative to deliver said sum synchronization control signal, and a synchronous detector which receives said sum control signal and an alternation signal and is operative to deliver said difference synchronization control signal.

BRIEF DESCRIPTION OF THE DRAWINGS

FIG. 1 is a schematic diagram of a correlator of conventional construction;

FIGS. 2 and 3 represent alternative examples of correlation functions;

FIG. 4 is a schematic block diagram of a known form of device for obtaining synchronization control signals;

FIG. 5 represents the control signals obtained with the known device of FIG. 4;

FIG. 6 represents examples of pseudo-random codes which may be used for the transmission and reception codes in the method in accordance with the invention, and also shows an alternation signal corresponding to the alternating code sequences;

FIG. 7 is a schematic block diagram of a device for obtaining synchronization control signals in a system in accordance with the invention; and, FIG. 8 represents the control signals obtained with the device of FIG. 7.

DESCRIPTION OF THE PREFERRED EMBODIMENT

With reference to FIG. 1, it will be recalled that a correlator is a circuit which effects an approximation of the function of correlation between the pseudo-random sequence obtained in the coded signal SC received and the pseudo-random sequence SPr generated by the receiver. This circuit comprises, in succession, a modulator 1 receiving SC and SPr, a narrow band filter 2, and an envelope detector 3 which delivers the approximate value of the correlation function f. When the modulation used is a phase modulation of type O -π, the correlation function between the coded signal received and the coded signal generated has the triangular characteristic shown in FIG. 2.

According to particular alternatives this characteristic may vary slightly. For example, in the case of modulation of the type known as MSK (minimum shift keying), it may assume a sinusoidal characteristic as shown in FIG. 3, or any other approaching form. This correlation function is periodic.

In the known synchronization device depicted in Figure 4, the coded signal SC received is applied to two correlators 4 and 5 which receive respectively two shifted versions SPra (termed advanced sequence) and SPrr (termed retarded sequence) of the pseudo-random sequence SPr generated by a generator 6. The correlators 4 and 5 deliver respectively an advanced correlation function fa and a retarded correlation function fr. The synchronization control signals are obtained by means of an addition circuit 7 receiving fa and fr and delivering a sum control signal SAS, and a differentiating circuit 8 also receiving fa and fr and delivering a difference control signal SAD.

The signals fa, fr, SAS and SAD are represented in FIG. 5.

The sum signal SAS enables detection, by its level different from O, of the passage in phase of the codes generated respectively in the transmitter and the receiver. The difference signal SAD enables, by using the voltage variations on both sides of the central O, control of the clock driving the generator of the receiver, thus maintaining the codes in phase.

FIG. 6 illustrates an example of pseudo-random codes which may be used in carrying out the method in accordance with the invention.

The pseudo-random sequence SPe generated by the transmitter is composed of two alternating half sequences of binary values having a nil or almost nil cross-correlation function, and each lasting one half period T/2. In the example illustrate:
the first half-sequence is: 1110010
and the second half-sequence is: 1010011.
Similarly, the pseudo-random sequence SPr generated by the receiver is also composed of two alternating binary half-sequences of equal duration. The first half-sequence is identical with that of SPe, but the second is shifted relative to the corresponding half-sequence of SPe. In the example shown, the shift is of a duration equal to one bit so that:
the first half-sequence is: 1110010
and the second half-sequence is: 1101001
The shift of the second half sequence amounts to a circular rotation as this signal is periodic.

There is also represented in FIG. 6 the alternation signal Salt whose period is equal to that of the pseudo-random sequences.

FIG. 7 depicts a synchronization device in accordance with the invention for producing synchronization control signals from the coded signal SC received from the transmitter and the code sequence SPr generated by the receiver. The device comprises a correlator 9 of the type described with reference to FIG. 1, which receives the received coded signal SC and the pseudo-random sequence SPr originating from the generator 10 of the receiver as described with reference to FIG. 6. By analogy with the conventional method described earlier the correlation function f obtained from the correlator 9 represents the sum control signal SAS. The difference control signal SAD is obtained by synchronous detection of the function f by the alternation signal Salt using a multiplier circuit 11.

The characteristics of the control signals SAS and SAD which are obtained are shown in FIG. 8. As will be appreciated, they are identical to those shown in FIG. 5 obtained from the conventional device, and can thus be used to achieve synchronization of the transmitter and receiver codes in the same way as is already known.

The method and device in accordance with the invention simplifies the production of the synchronization control signals compared with the prior art, and will be useful in all applications of spread spectrum transmissions by direct sequence wherein it is desired to minimise the number of circuits required. Examples of such applications may be found in remote controls of moving bodies, portable transceivers, satellite links, radars, etc.

What is claimed is:

1. A method of coding and decoding a spread spectrum transmission comprising the steps of:
    (a) generating a transmission code consisting of a psuedo-random sequence of binary values;
    (b) controlling a modulator using said transmission code to modulate the real signal to be transmitted;
    (c) transmitting and receiving said modulated signal;
    (d) generating a reception code for use in demodulating the received signal;
    (e) synchronizing said reception code with said transmission code by correlation of said reception code with the received signal by a single correlator; and
    (f) controlling a demodulator by means of said synchronized reception code to demodulate said received signal to derive said real signal;
wherein said transmission code generated in step (a) comprises a pseudo-random sequence of period T consisting of two alternating pseudo-random half-sequences of period T/2 and of nil or almost nil cross-correlation, and said reception code generated in step (d) is identical to said transmission code except that one of the half-sequences of said reception code is shifted as a periodic signal relative to the corresponding half sequence of said transmission code.

2. A method according to claim 1, wherein the shift between the relatively shifted half-sequences of said transmission and reception codes is equal to one bit.

3. In a communications system comprising a transmitter and at least one receiver, means for coding and decoding a spread spectrum transmission comprising:
    in the transmitter, a first code generator for generating a transmission code consisting of a pseudo-random binary sequence of period T and composed of two alternating pseudo-random half-sequences of period T/2 and with nil or almost nil cross-correlation, and a modulator controlled by said transmission code to modulate the real signal to be transmitted and thereby generate a coded signal;
    and in said at least one receiver, a second code generator for generating a reception code which is identical to said transmission code except that one of the half-sequences of said reception code is shifted in a circular rotational sense relative to the corresponding half-sequence of the transmission code, a demodulator controlled by said reception code to demodulate said coded signal received from said transmitter and to derive said real signal, and a synchronization device for synchronizing said second code generator with said first code generator by correlation of said reception code with said received coded signal to derive sum and difference synchronization control signals, said device comprising a single correlator which receives said received coded signal and said reception code generated by the second code generator and is operative to deliver said sum synchronization control signal, and a synchronous detector which receives said sum control signal and an alternation signal and is operative to deliver said difference synchronization control signal.

4. Coding and decoding means according to claim 3, wherein said modulator comprises a $0-\pi$ phase modulator, and said demodulator comprises a $0-\pi$ phase demodulator.

5. Coding and decoding means according to claim 3, wherein said synchronous detector comprises a multiplier circuit.

* * * * *

UNITED STATES PATENT AND TRADEMARK OFFICE
CERTIFICATE OF CORRECTION

PATENT NO. : 4,873,699

DATED : October 10, 1989

INVENTOR(S) : ALAIN SAUSSIER ET AL

It is certified that error appears in the above-identified patent and that said Letters Patent is hereby corrected as shown below:

Column 1, line 18, delete "related" and insert therefor --relates--;

line 67, delete "recpetion" and insert therefor --reception--.

Column 2, line 23, delete "signa;" and insert therefor --signal--.

Column 3, line 47, delete "illustrate:" and insert therefor --illustrated:";

line 59, delete "half sequence" and insert therefor --half-sequence--.

Signed and Sealed this

Eleventh Day of December, 1990

Attest:

HARRY F. MANBECK, JR.

Attesting Officer

Commissioner of Patents and Trademarks